US008733555B2

(12) United States Patent
Moore et al.

(10) Patent No.: US 8,733,555 B2
(45) Date of Patent: May 27, 2014

(54) PRESSURE RESISTANT FILTER CARTRIDGE

(75) Inventors: Jonathan D. Moore, Manchester, CT (US); Timothy M. Sasur, Newington, CT (US)

(73) Assignee: Stanadyne Corporation, Windsor, CT (US)

( * ) Notice: Subject to any disclaimer, the term of this patent is extended or adjusted under 35 U.S.C. 154(b) by 216 days.

(21) Appl. No.: 13/115,199

(22) Filed: May 25, 2011

(65) Prior Publication Data

US 2012/0298571 A1      Nov. 29, 2012

(51) Int. Cl.
*B01D 27/00*      (2006.01)
*B01D 35/00*      (2006.01)
*B01D 35/30*      (2006.01)
*B01D 35/31*      (2006.01)
*B01D 29/00*      (2006.01)

(52) U.S. Cl.
USPC ........... 210/455; 210/248; 210/435; 210/443; 210/450; 210/454

(58) Field of Classification Search
USPC .................. 210/348, 435, 440, 443, 450, 455
See application file for complete search history.

(56) References Cited

U.S. PATENT DOCUMENTS

| 2,747,738 | A  | * | 5/1956  | Johnson et al. | ............... 210/130 |
| 5,753,117 | A  | * | 5/1998  | Jiang          | ............... 210/232 |
| 6,471,070 | B2 |   | 10/2002 | Janik          |                          |
| 7,303,673 | B1 | * | 12/2007 | Glazewski      | ............... 210/232 |
| 2004/0084361 | A1 |   | 5/2004 | Janik et al.   |                          |
| 2006/0062567 | A1 | * | 3/2006 | Reder et al.   | ............... 396/388 |
| 2011/0031181 | A1 |   | 2/2011 | Hacker et al.  |                          |

FOREIGN PATENT DOCUMENTS

JP          51-062549 A      5/1976
WO          2009070184 A1    6/2009

OTHER PUBLICATIONS

International Search Report and Written Opinion for International Application No. PCT/US2012/035739, mailed Oct. 18, 2012.

* cited by examiner

*Primary Examiner* — Benjamin Kurtz
(74) *Attorney, Agent, or Firm* — Alix, Yale & Ristas, LLP (57) ABSTRACT

A fuel filter cartridge includes a housing having first and second shell sections. The shell sections are generally symmetric about a cartridge axis and joined together. The first shell section has a convex-shape when viewed from a side and includes an end portion, a cylindrical side wall portion, and a transition portion connecting the side wall portion to the end portion. The end portion has an end surface forming a cartridge opening coaxial with the cartridge axis. The transition portion has a radius of 0.125-1.125 inches. A filter having at least one filter element is disposed within the housing.

10 Claims, 8 Drawing Sheets

Prior Art

Fig. 1

Prior Art

PRESSURE RESISTANT FILTER CARTRIDGE

BACKGROUND

This invention relates generally to devices for filtering and separating liquids. More particularly, the present invention relates to fuel filters for removing foreign particles and separating water from fuel of the fuel supply system of an internal combustion engine.

The absence of high standards of quality control in diesel fuel supplies dictates that an effective fuel filter be incorporated into the fuel supply system for a diesel engine. It is not uncommon for diesel fuel to have significant quantities of abrasive particles and water. The abrasive particles present the potential for permanent damage to components of the fuel injection pump. The abrasive particles can also adversely effect the performance of the pump by destroying the ability of the fuel injection pump to precisely meter and deliver fuel at high pressures. The presence of water in the diesel fuel supply can cause rusting of engine components, and during freezing conditions, can result in interruption of the fuel injection system and/or seizure of moving components.

A number of conventional fuel filters perform the dual function of removing particulate material from the diesel fuel and separating water from the fuel. Commonly, the fuel filters employ a disposable filter cartridge which is replaced at pre-established intervals of filter usage. U.S. Pat. No. 6,471,070 assigned to the assignee of the present invention, discloses such a fuel filter. When the fuel filters are installed in a fuel line having relatively high fuel pressure, the substantially planar upper surface of the top cap of these conventional filter cartridges has a tendency to bulge upward. The displacement of the top cap upper surface can result in fuel leakage and/or cause binding of the retainer collar mounting the filter cartridge to the filter base.

SUMMARY

There is provided a fuel filter cartridge comprising a housing including opposing first and second shell sections. The shell sections are generally symmetric about a cartridge axis and joined together. The first shell section has a convex-shape when viewed from a side and comprises an end portion, a cylindrical side wall portion, and a transition portion connecting the side wall portion to the end portion. The end portion has an end surface forming a cartridge opening substantially coaxial with said cartridge axis. The transition portion has a radius of 0.125-1.125 inches. A filter having at least one filter element is disposed within the housing.

The transition portion may have a radius of 0.5-0.625 inches.

The first section end portion also includes a clip element having a substantially cylindrical inner side wall segment that defines the cartridge opening. An outer rim segment extends axially inward and radially inward from the end surface to the inner side wall segment first end section.

The clip element also has a circumferential lip segment extends radially outward from the inner side wall segment second end section.

The filter cartridge may also comprise a sealing grommet mounted within the cartridge opening. The sealing grommet includes an upper shoulder extending radially over the clip element outer rim segment and a lower shoulder extending radially under the clip element lip segment.

The sealing grommet may also include a recess surface disposed intermediate the upper and lower shoulders. The recess surface engages the clip element inner side wall segment.

The sealing grommet may also include an inner wall defining a bore and at least one seal protrusion extending radially inward from the inner wall. The seal protrusion has a substantially triangular cross-sectional shape.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to the drawings wherein like numerals represent like parts throughout the several figures, a pressure resistant filter cartridge in accordance with the present disclosure is generally designated by the numeral 10. The filter cartridge 10 is especially adapted for incorporation into the fuel supply system of an internal combustion engine (not illustrated), such as a diesel engine, for removing particulate matter from fuel and separating the water from the fuel.

The filter cartridge 10 is removably mounted to a filter base by means of a retainer collar in a manner similar to that of the filter cartridge of U.S. Pat. No. 6,471,070 hereby incorporated by reference. As shown therein, the base is an inverted cup-like receptacle which forms a skirt defining a lower receiving cavity for upper portions of the filter cartridge 10. An elongated sleeve-like inner conduit and an outer concentric sleeve-like conduit extend axially downward from the center of the base. The conduits provide generally coaxial fluid communication between the base and the disposable cartridge. An inlet connector connects with the fuel line to provide fluid communication through the conduit, an upper chamber of the filter cartridge, and an interior passageway. An outlet connector connects with the fuel line to provide external fluid communication from conduit.

Figure 1:
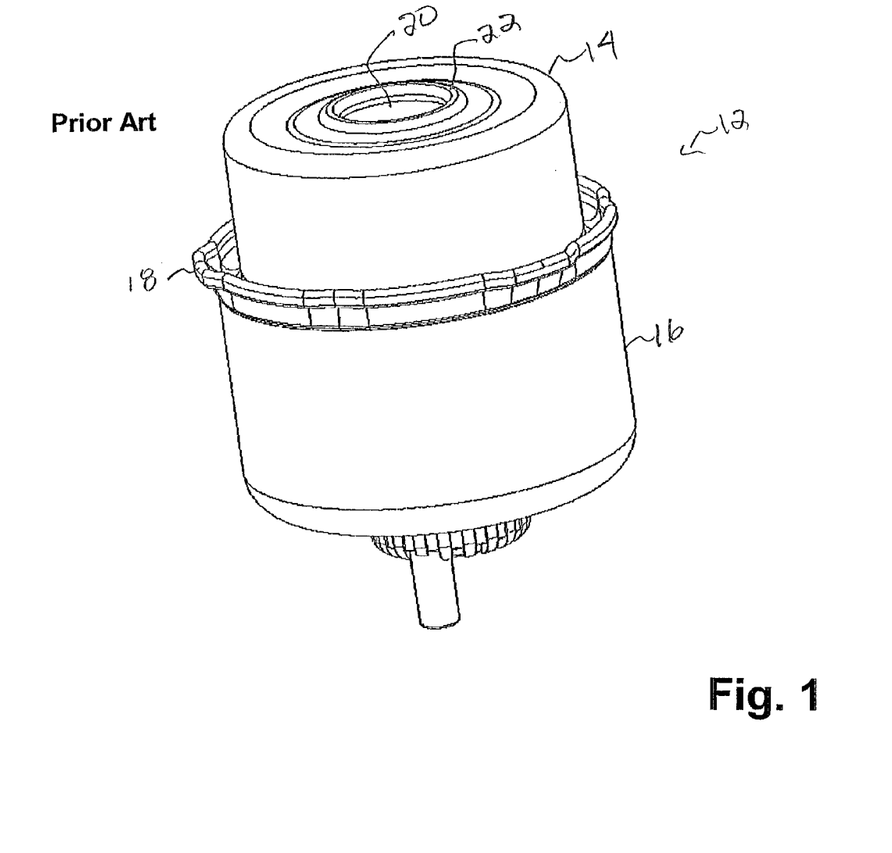
FIG. 1 is a perspective view of a conventional fuel filter.

With reference to FIG. 1, conventional filter cartridges 12 comprise a can-like enclosure formed by a pair of opposed upper and lower sections 14, 16 that are joined along a circumferential roll seam 18. The upper section, or top cap 14, which is smaller in diameter than the lower section 16, is received by the base receptacle. The upper section 14 is dimensioned to be closely accommodated in the base receptacle. A central axial opening 20 in the upper section 14 is dimensioned to receive the second and first conduits, respectively. A sealing grommet 22 mounted at the opening 20 in the upper section 14 diametrically fluidically seals against outer conduit.

The filter cartridge 12 employs a filter element having a continuous fan-like configuration. The inner surface of the lower section and the outer surface of the filter element media create one fuel plenum. The inner surface of the primary filter element media and the outer surface of an inner cylinder of the primary filter element create a second fuel plenum. Passages at the bottom of the two plenums provide fluid communication with the inner and outer conduits.

Figure 2:
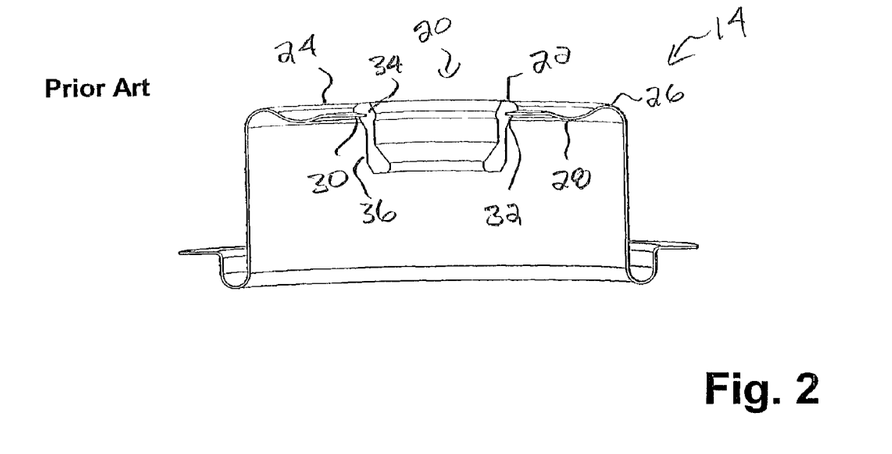
FIG. 2 is an enlarged sectional view of the top cap of the fuel filter of FIG. 1.

With additional reference to FIG. 2, the upper surface 24 of the top cap 14 of the conventional filter cartridge 12 acts as a substantially planar surface in spite of having an upwardly extending outer protrusion 26, a downwardly extending intermediate protrusion 28 and a planar inner flange 30. The edge 32 of the inner flange 30 forms the axial opening 20 in which the sealing grommet 22 is mounted, with the edge 35 being received within a circumferential recess 34 in the outer wall 36 of the sealing grommet 22. When fuel filters of this type are installed in a fuel line having relatively high fuel pressure, the upper surface 24 of the top cap 14 has a tendency to bulge upward. Due to their relatively short height and small radius, the protrusions 26, 28 do not provide sufficient mechanical strength to resist the force exerted by the high pressure fuel. The displacement of the top cap upper surface 24 may pull the inner flange edge 32 out of the sealing grommet recess 34, allowing fuel to leak between the inner flange 30 and the sealing grommet 22. The displacement can also cause the top cap 14 to exert force on the inner surface of the filter base, biasing the filter cartridge away from the filter base and thereby binding the retainer collar mounting the filter cartridge to the filter base.

Figure 3:
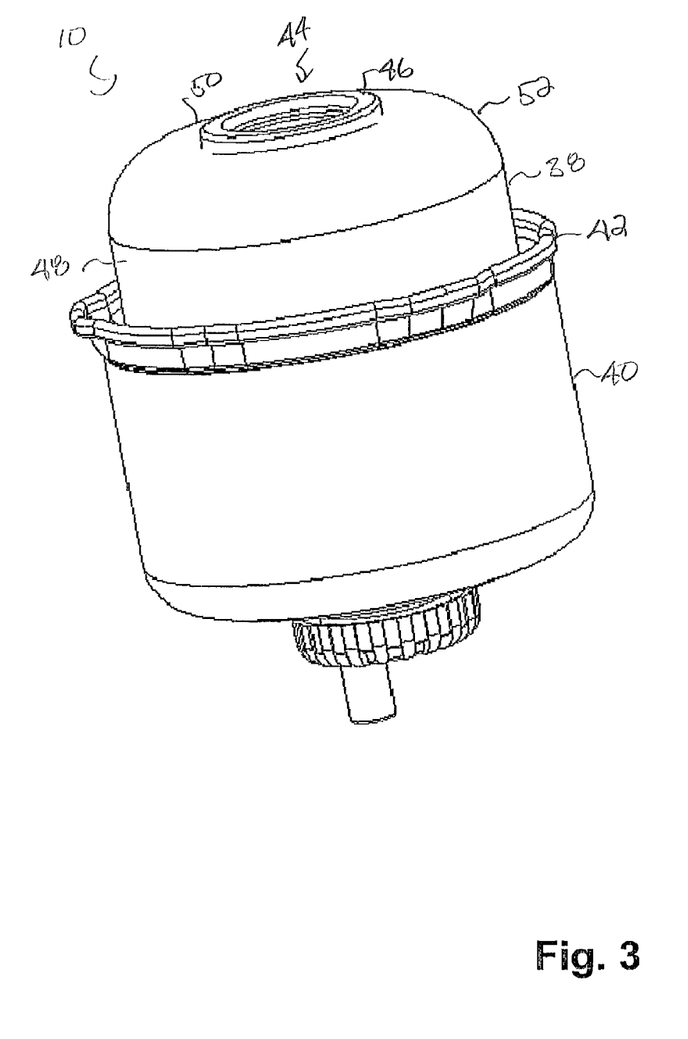
FIG. 3 is a perspective view of a pressure resistant filter cartridge in accordance with the disclosure.
Figure 4:
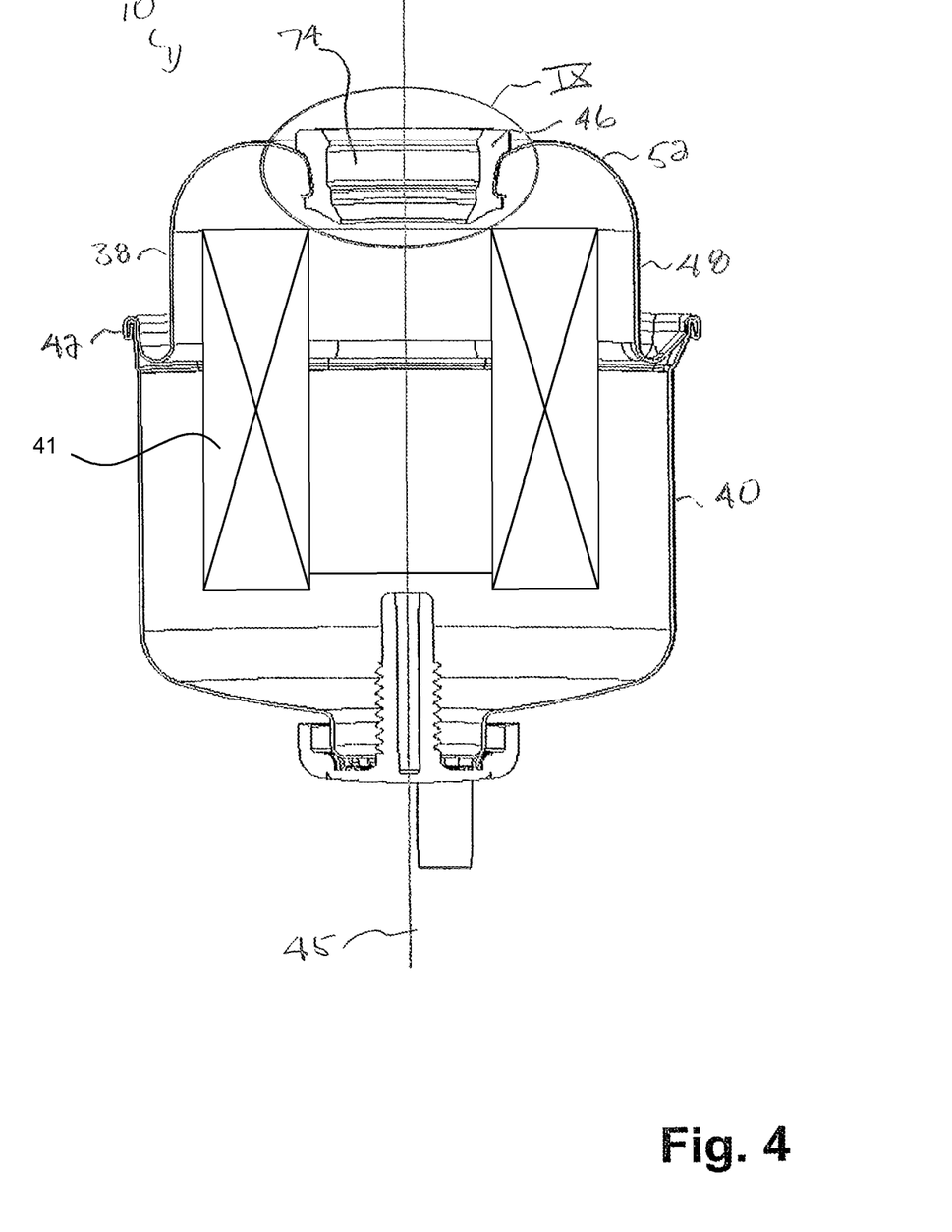
FIG. 4 is a sectional view of the filter cartridge enclosure of FIG. 3.
Figure 5:
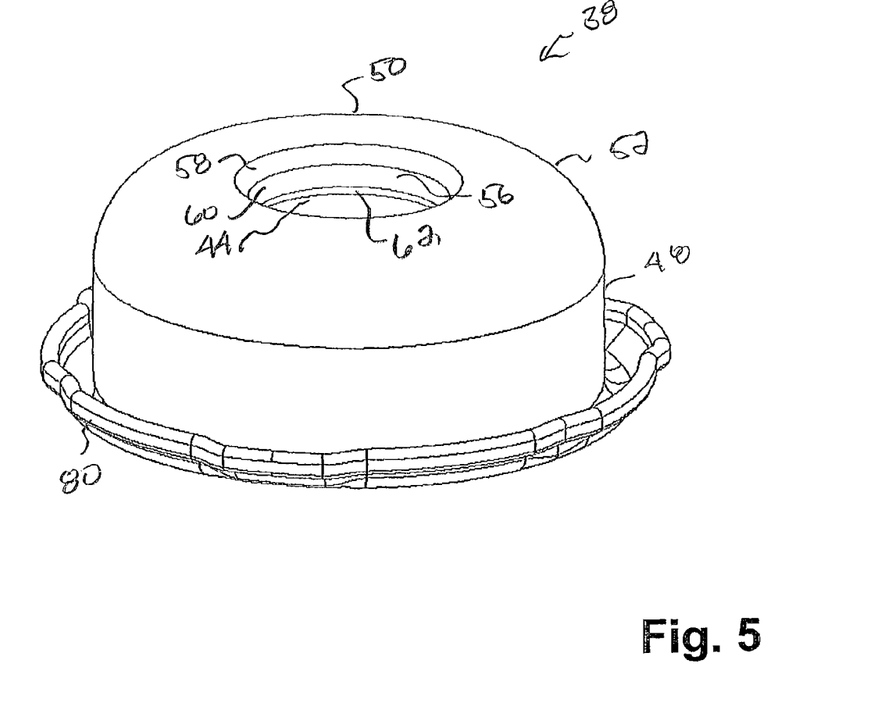
FIG. 5 is an enlarged perspective view of the filter cartridge enclosure top cap of FIG. 3.
Figure 6:
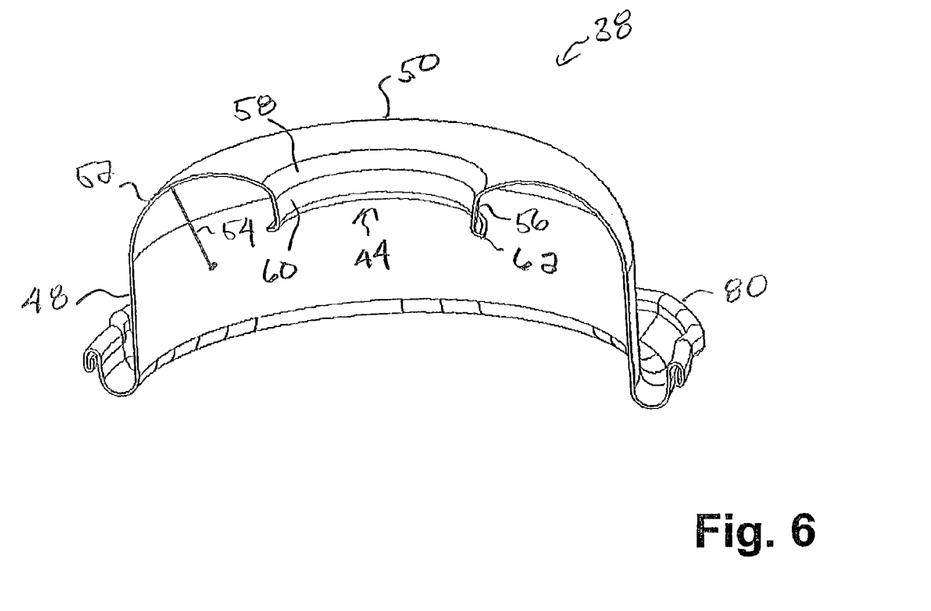
FIG. 6 is a sectional view of the top cap of FIG. 5.

FIGS. 1, 3 and 4 illustrate a drain valve situated in a drain opening defined by the cartridge lower section 16, 40. Such drain valves are commonly employed to permit the drainage of fluid from within the cartridge, 12, 10 without removing the cartridge 12, 10 from a filter head (not shown). As shown in FIG. 4, the drain valve includes a threaded shaft engaged with threads defined inside the drain opening. Rotating the drain valve in a first direction relative to the cartridge moves opens the drain valve, permitting fluid to flow out of the cartridge housing, while rotation of the drain valve in the opposite, second direction closes the drain valve. Such drain valves are conventional and their construction and operation are well understood by those skilled in the art of fuel filtration.

With reference to FIGS. 3-6, the enclosure of a pressure resistant filter cartridge 10 in accordance with the present disclosure comprises an enclosure formed by a pair of opposed upper and lower sections 38, 40 that are joined along a circumferential roll seam 42. The enclosure surrounds a filter element 41 arranged to filter fluid passing through the cartridge as is known in the art. Similar to the conventional filter cartridge 12, the upper section, or top cap 38, is received by the base receptacle. A central opening 44 in the top cap 38 is coaxial with axis 45 and dimensioned to receive the second and first conduits, respectively. A sealing grommet 46 mounted at the opening 44 in the top cap 38 diametrically fluidically seals against outer conduit.

The top cap 38 has a convex-shape when viewed from the side. More specifically, the side wall portion 48 of the top cap 38 is joined to the top portion 50 of the top cap 38 by an arcuate transition portion 52 having a large radius compared to the radius of the outer protrusion 26 of the conventional filter cartridge 12. The radius 54 of the transition portion 52 may be 0.125-1.125 inches, and preferably is 0.5-0.625 inches.

Figure 10:
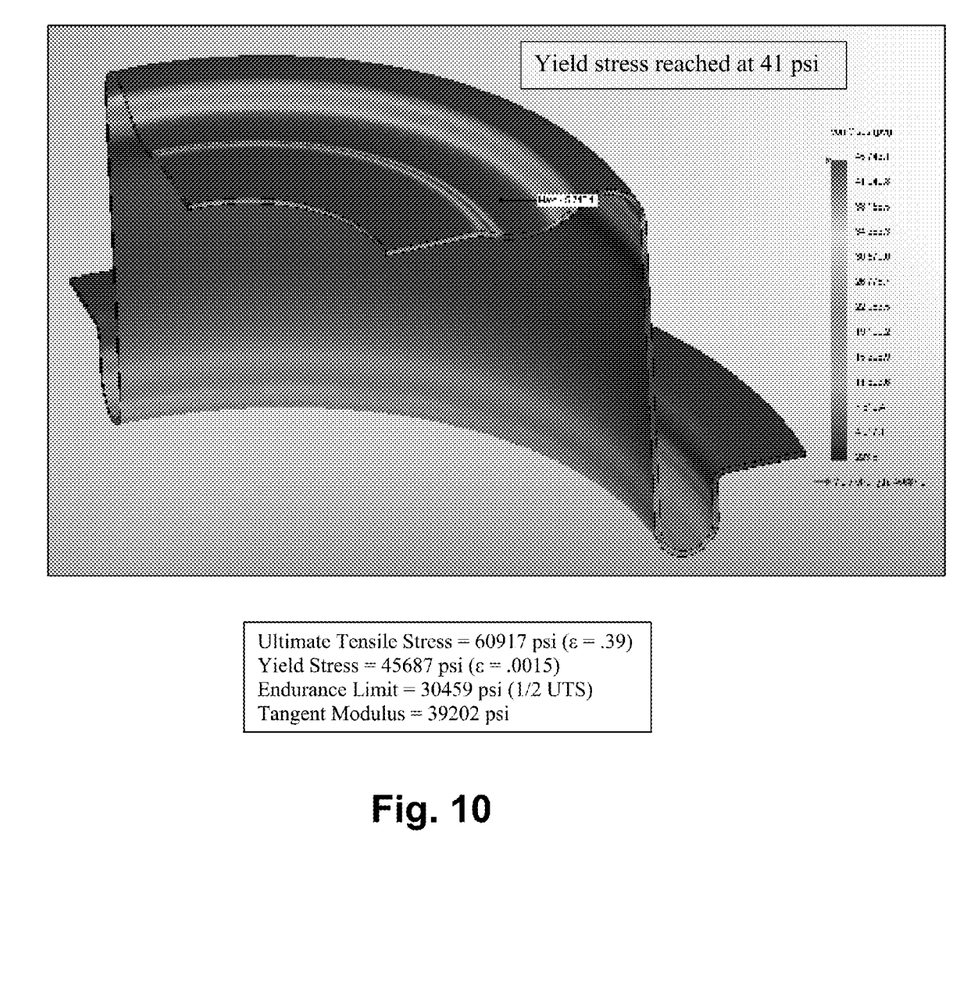
FIG. 10 is a stress analysis of the top cap of FIG. 2 showing the stress distribution at 41 psi.
Figure 11:
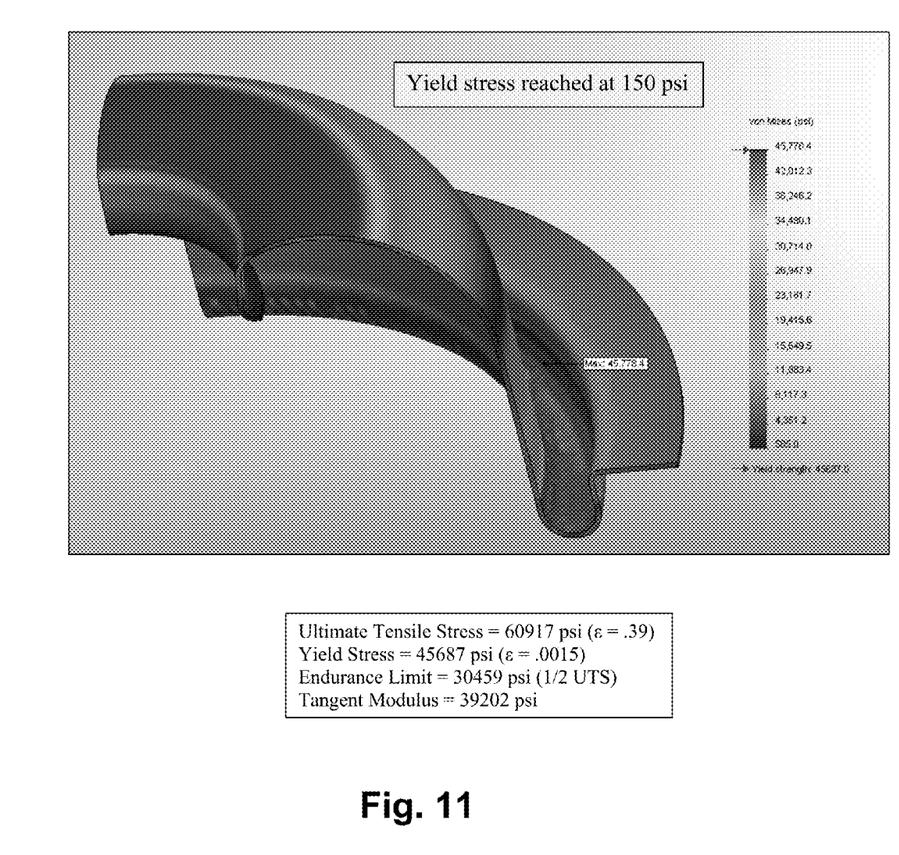
FIG. 11 is a stress analysis of the top cap of FIG. 4 showing the stress distribution at 150 psi.

Experimentally, it has been shown that changing the shape of the top cap 38 provides a significant increase in the yield stress over that of the conventional top cap 14. In one set of tests, FIGS. 10 and 11, the pressure required to cause failure of the top cap structure increased from 41 psi (for conventional top cap 14) to 150 psi (for the subject top cap 38).

Figure 9:
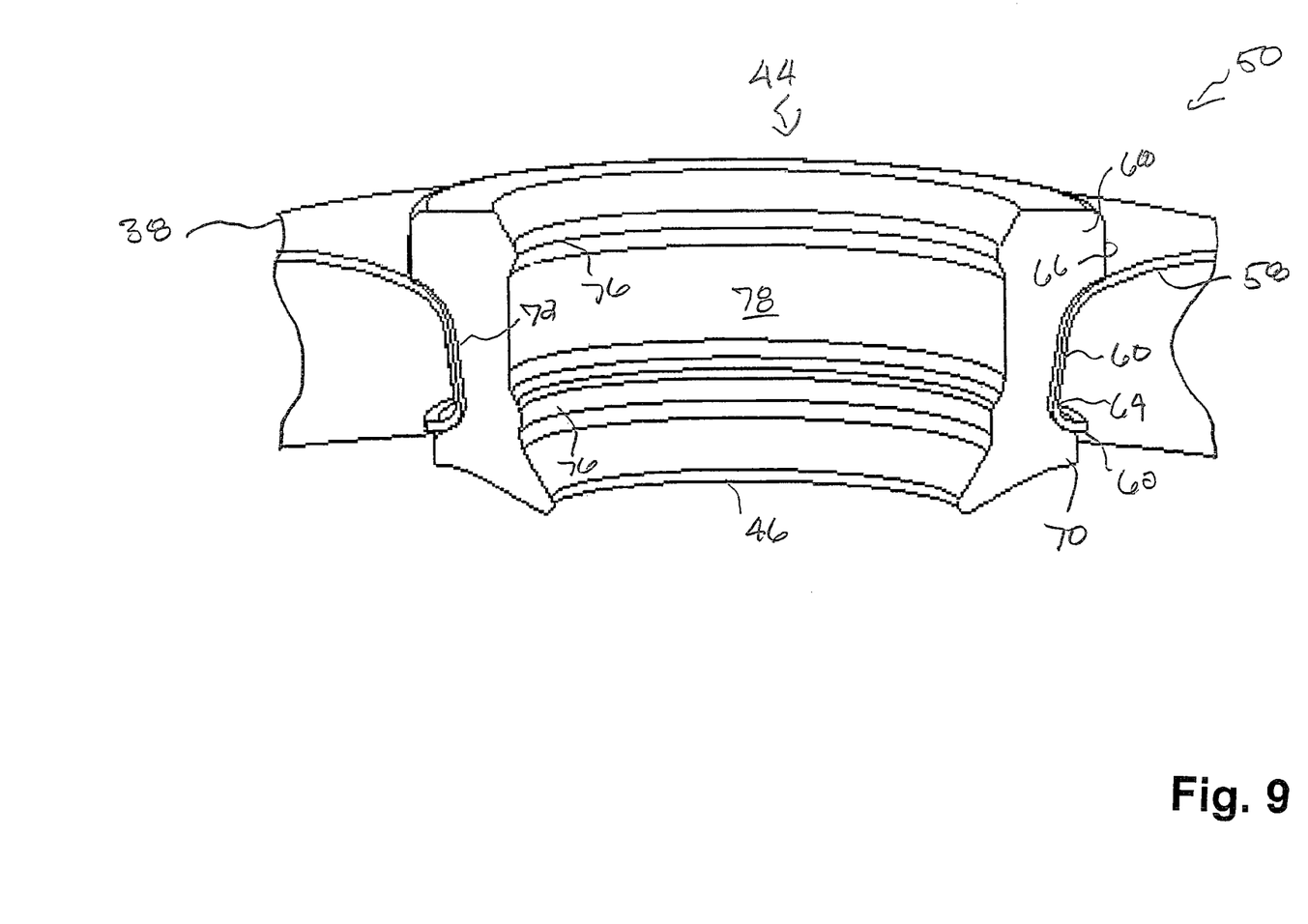
FIG. 9 is an enlarged view of area IX of FIG. 4.

With additional reference to FIG. 9, the top portion 50 of the top cap 38 includes an inner clip element 56 instead of the planar inner flange 30 of the conventional filter cartridge top cap 14. The clip element 56 has an outer rim 58 that extends axially inward and downward from the top surface 50 to a substantially cylindrical inner side wall segment 60. The side wall segment 60 extends axially downward to a circumferential lip segment 62 that extends radially outward from lower end 64 of the side wall segment 60.

The outer surface 66 of the sealing grommet 46 includes circumferential upper and lower shoulders 68, 70 separated by a circumferential intermediate recess 72. As shown in FIG. 9, the clip element side wall segment 60 is positioned in the sealing grommet recess 72, with the upper shoulder 68 extending radially over the clip element outer rim 58 and the lower shoulder 70 extending radially under the clip element lip segment 62. The bore 74 of the sealing grommet may include one or more seal protrusions 76 extending radially inward from the inner wall 78 of the sealing grommet 46. The seal protrusions 76 may have a substantially triangular cross-sectional shape, whereby the outer surface of the outer conduit elastically deforms the seal protrusions 76 when the filter cartridge 10 is installed to provide a fluid-tight seal.

It should be appreciated that when the fuel system is operating and high pressure fuel applies force to the inner surface of the top cap 38, the clip element side wall segment 60 is biased radially inward by this force. If the fuel pressure force is sufficient, the clip element side wall segment 60 pivots about the clip element outer rim 58 and is forced into firmer engagement with surface of the sealing grommet recess 72. Accordingly, any displacement of the top cap 38 caused by the high pressure fuel promotes improvement of the fluid-tight seal between the top cap 38 and the sealing grommet 46 rather than causing the top cap 38 to separate from the sealing grommet 46.

Figure 7:
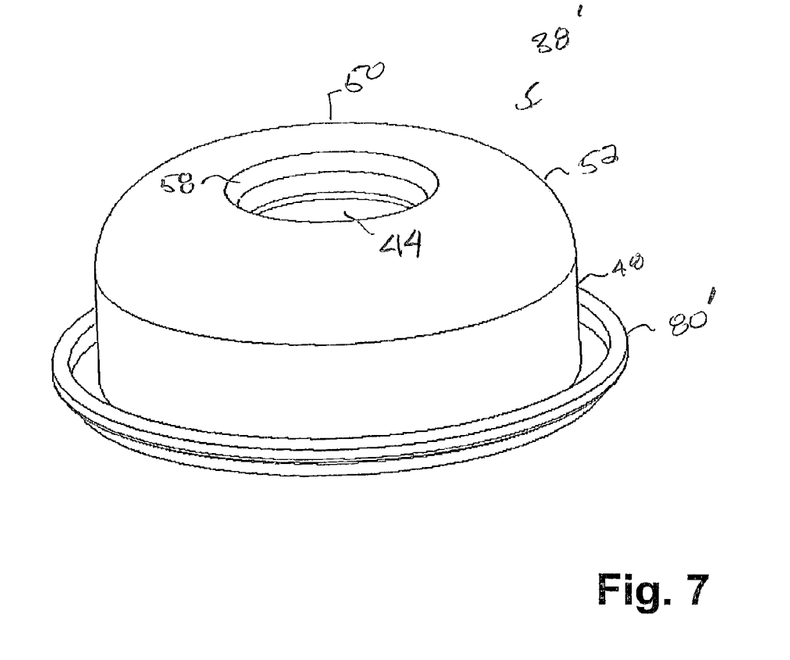
FIG. 7 is a perspective view of a variation of the filter cartridge enclosure top cap of FIG. 3.
Figure 8:
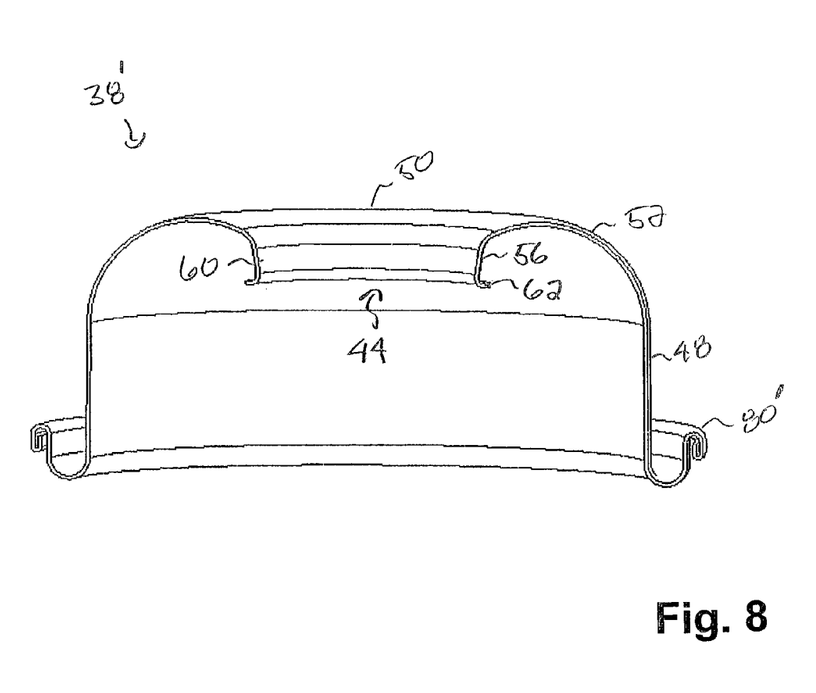
FIG. 8 is a sectional view of the top cap of FIG. 7.

The filter cartridge 10 may assume a wide variety of configurations. For example, in the variation shown in FIGS. 7 and 8, the outer lip 80' of the top cap 38' utilized in forming the roll seam 42 with the lower section 40 is substantially circular compared to the scalloped outer lip 80 of the top cap 38 of FIGS. 1-6.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A filter cartridge comprising:
a housing including first and second housing sections generally symmetrically disposed about a longitudinal axis and joined at a circumferential shoulder to define an interior volume extending between first and second ends of said housing,
said first housing section including a grommet support clip projecting into said interior volume, said grommet support clip defining a fluid flow opening coaxial with said longitudinal axis, said first housing section including a generally cylindrical first side wall with a first side wall first end adjacent said circumferential shoulder, said first side wall having a first diameter and said first housing section including a first transition portion extending radially inwardly from a first side wall second end to said grommet support clip, said first transition portion defined by a radius rotated about a point within said interior volume, rotation of said radius subtending an obtuse angle;

said second housing section including a generally cylindrical second side wall having a second diameter larger than said first diameter, said second side wall extending between said circumferential shoulder and a second transition portion at said housing second end, said second transition portion extending radially inwardly from said second side wall to a drain opening defined at said housing second end;

a grommet radially surrounded by said grommet support clip, said grommet extending from an upper shoulder outside said interior space to a lower shoulder projecting into said interior space;

a drain valve situated in said drain opening and moveable between a first position where said drain valve closes said drain opening and a second position in which said drain valve permits fluid communication with said interior space through said drain opening; and filter media supported within said interior space for filtering fluid passing through said filter cartridge, wherein said housing is imperforate other than said fluid flow opening and said drain opening and configured to contain a fluid to be filtered.

2. The filter cartridge of claim 1, wherein said radius is a uniform radius between 0.5 and 0.625 inches.

3. The filter cartridge of claim 1, wherein said grommet support clip terminates in a lip protruding radially outwardly away from said longitudinal axis, said lip positioned in said interior volume.

4. The filter cartridge of claim 1, wherein said clip includes an axially oriented segment and said grommet includes an intermediate portion between said upper and lower shoulders, said intermediate portion complementary to and supported by said axially oriented segment.

5. The filter cartridge of claim 4, wherein said grommet intermediate portion includes at least one annular sealing protrusion projecting radially inwardly toward said longitudinal axis.

6. The filter cartridge of claim 5, wherein said annular sealing protrusion is generally triangular in cross section.

7. The filter cartridge of claim 1, wherein said first housing section is constructed of a single contiguous sheet of material extending from said circumferential shoulder to said grommet support clip.

8. A filter cartridge comprising:

a housing including first and second housing sections generally symmetrically disposed about a longitudinal axis and joined at a circumferential shoulder to define an interior volume extending between first and second ends of said housing, said first housing section including a grommet support clip projecting into said interior volume, said grommet support clip defining a fluid flow opening coaxial with said longitudinal axis, said first housing section including a generally cylindrical first side wall with a first side wall first end adjacent said circumferential shoulder, said first side wall having a first diameter and said first housing section including a first transition portion extending radially inwardly from a first side wall second end to said grommet support clip, said first transition portion defined essentially by a portion of a curve having a focus within said interior volume, said portion of a curve rotated about said longitudinal axis to define a convex three dimensional shape;

said second housing section including a generally cylindrical second side wall having a second diameter larger than said first diameter, said second side wall extending between said circumferential shoulder and a second transition portion at said housing second end, said second transition portion extending radially inwardly from said second side wall to said housing second end;

a grommet radially surrounded by said grommet support clip, said grommet extending from an upper shoulder outside said interior space to a lower shoulder projecting into said interior space; and filter media supported within said interior space for filtering fluid passing through said filter cartridge, wherein said housing defines a sealed vessel to contain fluid circulated through said filter media via said fluid flow opening.

9. The filter cartridge of claim 8, wherein said curve is a circle and said convex three-dimensional shape is a torus.

10. The filter cartridge of claim 8, comprising a drain opening at said housing second end, a drain valve situated in said drain opening and moveable between a first position where said drain valve closes said drain opening and a second position in which said drain valve permits fluid communication with said interior space through said drain opening, wherein said housing is imperforate except for said fluid flow opening and said drain opening.

* * * * *